May 23, 1933.  E. G. STAUDE  1,910,412
PLURAL CONTROL MECHANISM
Filed June 10, 1929   2 Sheets-Sheet 1
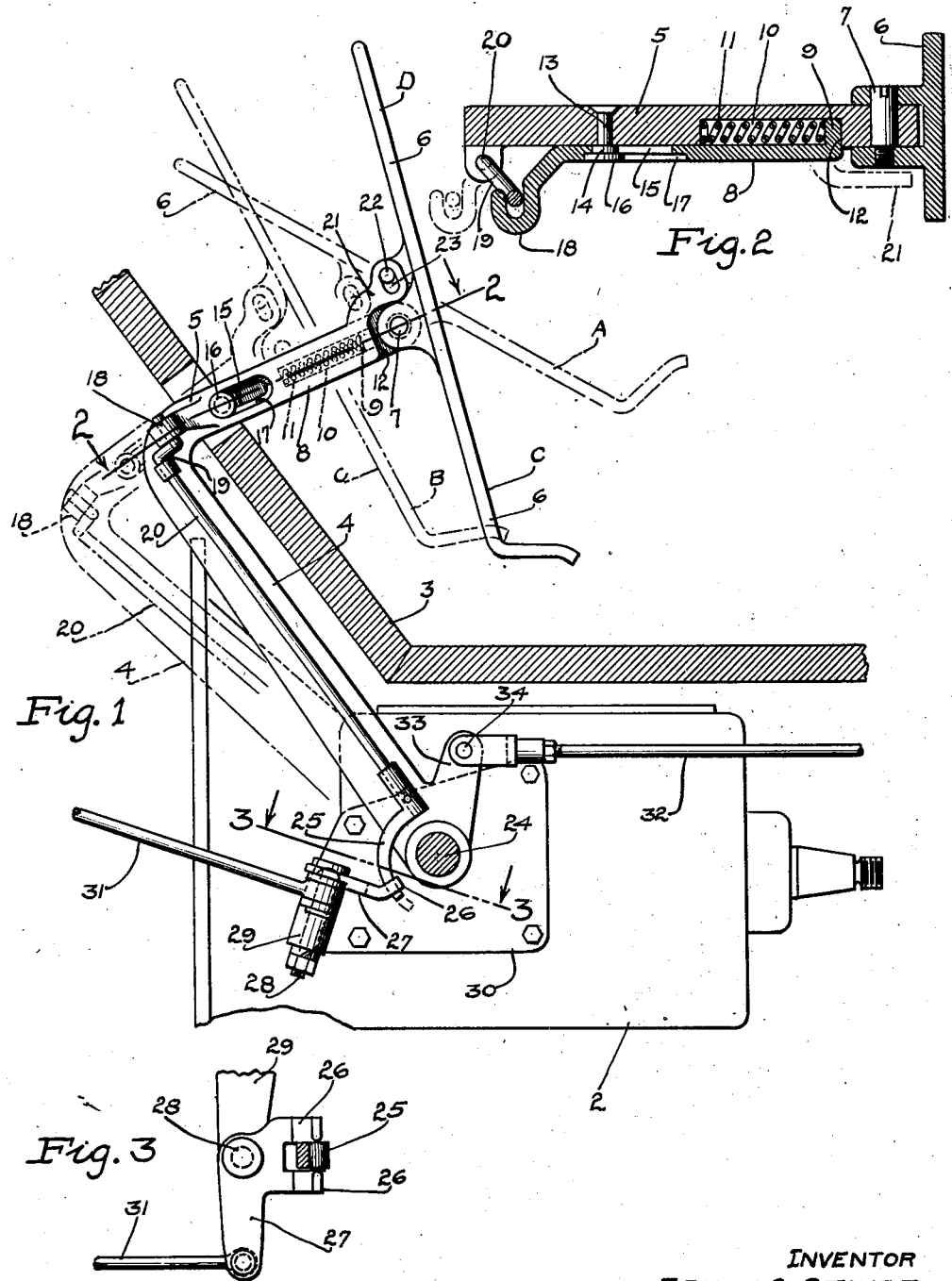
INVENTOR
EDWIN G. STAUDE
ATTORNEYS

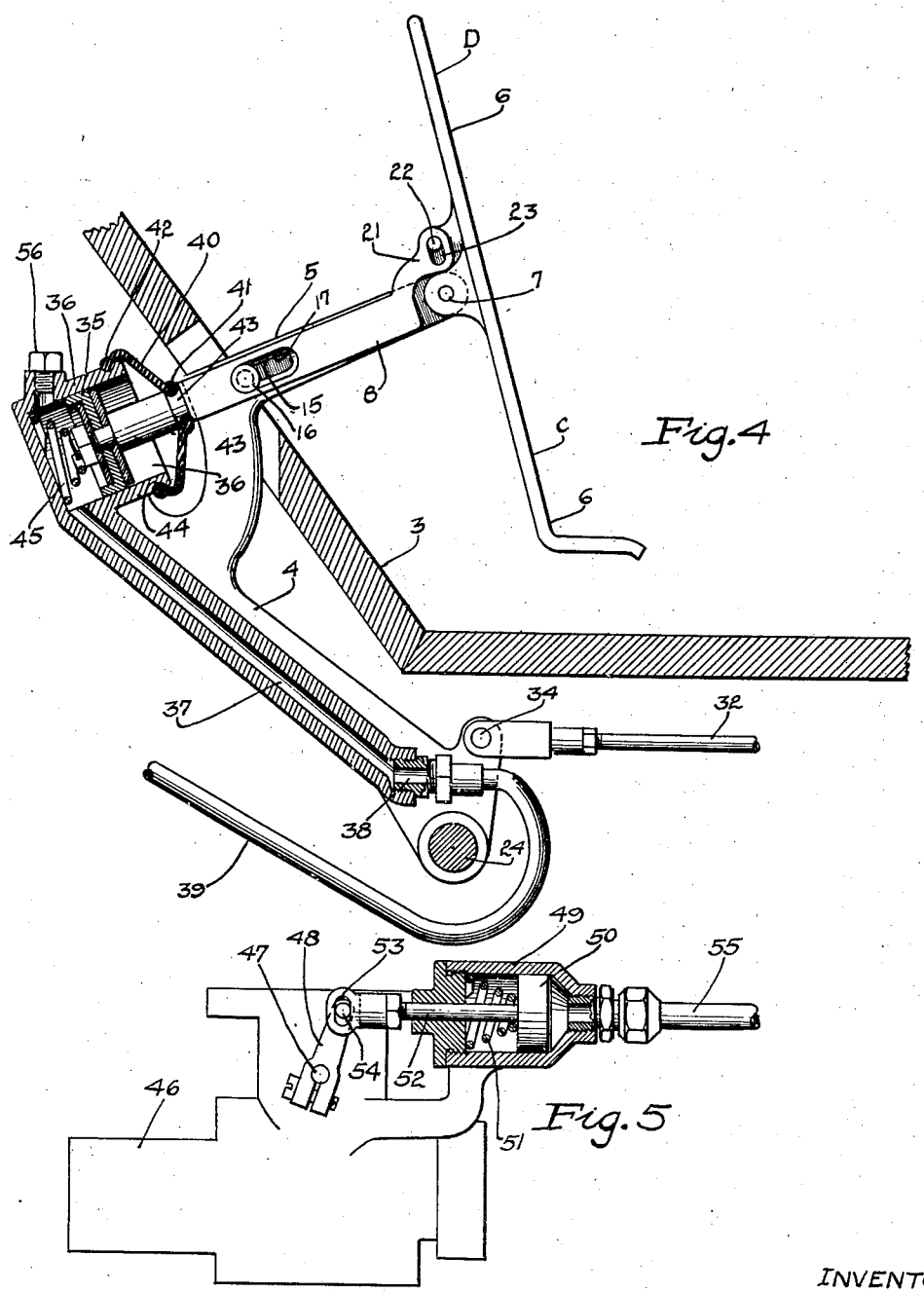

Patented May 23, 1933

1,910,412

UNITED STATES PATENT OFFICE

EDWIN G. STAUDE, OF MINNEAPOLIS, MINNESOTA

PLURAL CONTROL MECHANISM

Application filed June 10, 1929. Serial No. 369,688.

This invention relates to improvements in plural control mechanisms and finds valuable application in controlling co-ordinatable mechanisms of motor vehicles in a manner generally similar to that shown in my Reissue Patent Number 15,906, dated August 26th, 1924, in Patent Number 1,447,908, dated March 6th, 1923 and in Patent Number 1,514,-804, dated November 11th, 1924.
An important object is to provide selectively operable means for controlling the speed of a motor through the usual accelerator, and also for controlling the speed of a vehicle through the usual deceleration mechanism in such manner that the foot of the operator can obtain such control without taking the foot off of the control.

One of the primary objects of this invention is to provide a single control construction operable so that either the motor control or the vehicle deceleration control may be simultaneously or separately operated.

Other objects are to provide a mechanism which shall function in a practical manner for one control without disturbing the other control; to provide a mechanism which can be operated with ease and which can be arranged for the comfort of the operator; and to provide a mechanism which shall combine the operating motions of the two present separate controls of conventional type.

There is no intention to be limited to the character of mechanisms controlled. The invention can be applied as a control for many purposes, for example on brake and clutch mechanisms, on brake and throttle mechanisms, as herein shown, and on other co-ordinatable mechanisms differing from those used in automobiles. One of the valuable ideas of the invention is the provision of means with which the foot is engaged when the pedal is operated, with this foot-engageable means movable independently of the pedal during pedal movement, (or when the pedal is not moving) to control another mechanism either by movement of this foot-engageable member alone, or by simultaneous movements of pedal and foot elements at a different or the same rates of speed, and in different degrees. As applied herein, it is the object to permit throttle or clutch control during pedal movement, and at any stage during that movement, with the arrangement such that when the pedal is in normal retracted position the foot element is operable to control the throttle in the usual manner without depression of the pedal. Thus the operator's foot is always in a single position from which both controls or either control can be instantly selectively managed.

Features include the broad idea of controlling a plurality of mechanisms by manipulation of a pedal and means movable therewith, as well as all details of construction shown.

In the accompanying drawings, forming a part of this application:

Figure 1 is a side elevation showing my invention mounted on a conventional type of automobile transmission case and showing the floor boards in cross section;

Figure 2 is a section on line 2—2 of Figure 1;

Figure 3 is a section on line 3—3 of Figure 1 looking in the direction of the arrow, illustrating one means for connecting the pedal means to control the throttle, or other mechanism;

Figure 4 shows the application of my invention to a hydraulic or fluid control; and

Figure 5 is supplementary to Figures 1 and 4 and shows a section of the cylinder for controlling the lever of the butterfly valve of a carburetor, or throttle, the carburetor being of any preferred construction.

Referring to the drawings: 2 indicates the conventional type of automobile transmission, and 3 the usual floor boards. 4 indicates a brake pedal arm having the part 5 which protrudes through the floor boards, and to which a foot support 6 is pivoted at a point 7. On a side of the member 5, I slidably mount a forging 8. This forging 8 has a guide and abutment lug 9 adapted to move in a recess 10 of the member 5, see Figure 2. A spring 11 is placed within the recess 10, and bears against the lug 9 which holds the forging 8 against the stop 12 (formed by the wall of recess 10) near the pivot point 7 of the foot support 6. The forging 8 is slidably secured to the pedal extension 5 by a rivet 13 passing through slot 15 and having a head 14 engaging said slot 15, and further having a larger head portion 16 engaging a counter-sunk portion 17 of the slot 15. The forging 8 has a hook shape member 18 adapted to receive the arm 19 of the rod 20, to form a hinged connection for rocking shaft 20, when slide 8 is translated.

From the description just given, it is clear that the slide 8 can be translated against the action of spring 11, and that such translation will rock shaft 20, and that the slide 8 can be automatically returned to the full line position shown.

In order to translate the slide 8 against the action of spring 11, I provide a projection 21 on the slide 8, see Figure 1, which is slotted as at 23 to receive pin 22, which pin is secured to the foot support 6, or to a member mounted upon but capable of independent motion relative to the pedal arm. The slotted connection compensates for radial movement of the pin 22, as foot support pivots at the point 7. As the pedal 6 is tipped or rocked to the position shown in the dotted lines at A, the slide 8 is moved to the position shown in the dotted line, see Figures 1 and 2. The positions shown are extreme positions and, of course, any intermediate position may be obtained by the operator.

As the pedal 6 is tipped or rocked to the position shown in dotted lines in Figure 1, the slide 8 is correspondingly moved and the shaft 20 rocked. This swinging motion of foot support 6 can be made without depressing the pedal 4, and therefore the throttle control (see 25-27-31-48) is independent of pedal control. Moreover, the pedal can be operated without swinging the foot-support from the position shown in full lines in Figure 1. That this is true is shown by the dotted line position B of the element 6. This is accomplished by applying more pressure on side C of the lever-like foot lever than upon side D, in this instance by applying more pressure below the pivotal point 7 than above it. Moreover, if it is desired to control the throttle to accelerate the engine, this may be accomplished during movement of the lever 4 in either direction. Consider the case where the automobile is being started on a hill. To prevent the car from moving backwardly the service brake and foot pedal are generally used. The use of the service brake is often necessary because it is necessary to release the foot brake, to operate the accelerator. Under those conditions the operator is compelled to gradually release the brake as the clutch goes in. Using the present invention, it will seldom be necessary to use the emergency brake because the foot pedal can be held in while throttle acceleration is controlled. As the clutch goes in, the brake pedal is gradually released conformably to the speed of clutch engagement. It results therefore that under most conditions, the use of the emergency brake is unnecessary, and the throttle and brake can be controlled during release movement of the brake pedal.

I have above described how the shaft 20 is rocked as result of motion of the foot support, and I will now describe one type of motion transferring device, or coupling, whereby, as result of foot-support motion a motor-accelerator controlling mechanism is operated. Secured to the lower part of the rod 20, near the pivot 24, of the brake pedal 4, I provide an arcuate, in this instance circular arm 25, extending slightly eccentric to the pivot 24 of the pedal arm 4. The curved arm 25 is slidable between the arms 26 of a bellcrank lever 27. Bellcrank 27 is pivoted at point 28 on a lug 29, which is part of the bracket 30 that supports the pivot 24. To the bellcrank 27 at that side of the pivot 28 opposite the arms 26 is secured the accelerator rod 31. As the foot support 6 is rocked on the pivot 7, it will rotate arm 25, swing bellcrank 27 and manipulate the accelerator rod 31, giving the operator perfect control of the accelerator. This control in no way conflicts with the independent control of the brake applying mechanism. Should the operator now desire to apply the vehicle brakes, he presses against the foot support 6 (mostly on side C) and substantially in the usual manner and this motion will be transmitted to the brakes (not shown) through arm 4, short arm 33, and brake rod 32, pivoted at 34, to the arm 33. This depression of the pedal arm in no way alters the location or adjustment of the accelerator rod 31, because the curved depending arm 25 merely slides between the two arms 26 of bellcrank 27. Both controls for the accelerator and for operating the brakes are entirely independently operable, one being operated by rocking of the foot support, and the other by depressing or rocking the pedal arm.

I have shown my control connected to a brake rod 32. It is, of course, clear that the pedal arm 4 may be used in connection with any decelerating mechanism such as air pressure, vacuum or where the control is entirely mechanical.

In Figures 4 and 5, I have shown forging 8 connected to a piston 35, operating in cylinder 36, which cylinder is formed integral with the brake pedal arm 4. The cylinder 36 is connected with a passage 37 to an outlet 38. Since the total angle through which the conventional type of brake foot pedal arm travels is about 18 degrees, I find that by coiling a copper or aluminum tube 39 about the center 24, I can get enough spring action to make a direct connection and have a very practical, flexible joint within the limits of 18 degrees movement or thereabouts of the brake pedal arm 4. This is a valuable feature. In order to keep out various foreign substances, such as dirt, I protect the cylinder 36 at the open end by rubber fabric moulded covering 40. This covering is beaded at 41 and 42, adapted to fit in grooves 43 and 44 respectively of slide 8 and cylinder. A spring 45 within the cylinder 36, in this instance, is used to return the piston instead of the spring 11 in mechanical construction shown in Figure 2. This is a valuable feature.

46 represents an outline of a conventional type of carburetor, having the usual butterfly shaft 47 to which the usual control arm 48 is attached. Mounted on one side of this carburetor, I provide a cylinder 49 having a piston 50, which acts to automatically move the piston and arm in direction corresponding to closed throttle. The piston rod 52 is slotted as at 53 and a pin 54 carried by arm 48 slidably engages the slot to connect the parts. A pipe 55 establishes communication between cylinder 49 and pipe 39.

The space between the piston 50 and the piston 35 is filled with fluid, preferably 50% glycerin and 50% alcohol, and it is clear that as the foot support 6 is rocked similarly to the various positions described in Figure 1, the fluid within the chamber 37 will be put under variable pressure which acts against the piston 50 causing the same to move the shaft 47 to which the usual butterfly carburetor valve (not shown) is secured. The advantage of this control is greater simplicity and elimination of joints which require lubrication and accumulate dirt and dust. It is of course clear that as foot support 6 assumes the various positions, the spring 51 will follow up as the fluid recedes from the opposite side of the piston 50, return the piston to the position shown, and close the carburetor butterfly valve. Various means for filling the cylinder 36 may be adopted. For this purpose I have shown a filler cap 56, which may be removed and the fluid poured through this opening until the passages are filled.

I consider this invention particularly valuable for busses and heavy trucks, where the driver must have quick brake application in case of an emergency, because through my invention the time required to remove the foot from usual accelerator to brake pedal is saved, since the foot is at all times on the proper pedal and the natural tendency in pressing down the pedal is to bring the foot support 6 into the position shown in Figure 1 in full lines, and thereby closing the accelerator simultaneously with the action of applying the brakes, which may, as hereinbefore stated, either be air brakes, hydraulic brakes, or mechanical brakes.

In no case can the movement of one control alter the position of the other control.

The terminal connection 25, and its relation to the pivotal axis of the pedal and other mechanism operating means 27 is an important feature. It is conceivable, however, that means other than the rock shaft 20 could be used for moving the element 25 laterally with respect to the motion-plane of the pedal.

I claim as my invention:

1. A pedal arm adapted to swing on a pivotal axis and having an oscillatable foot piece, a mechanism and means for operating it, and means carried by the pedal and operatively connecting the foot piece with the mechanism operating means, said connecting means including a terminal member in relatively close proximity and substantially concentrically related to the pivotal axis of the pedal arm and having a lost motion connection with said mechanism operating means and adapted to maintain such engagement for all positions of the pedal.

2. A pedal arm adapted to swing on a pivotal axis and having an oscillatable foot piece, a mechanism and means for operating it, and means carried by the pedal and operatively connecting the foot piece with the mechanism operating means, said connecting means including a terminal member in relatively close proximity and substantially concentrically related to the pivotal axis of the pedal arm, and having a lost motion connection with said mechanism operating means, and adapted to maintain such engagement for all positions of the pedal, said terminal member being adapted to swing substantially in direction of the pivotal axis of the pedal arm.

3. A pedal arm adapted to swing on a pivotal axis and having an oscillatable foot piece, a mechanism and means for operating it, and means carried by the pedal and operatively connecting the foot support with the mechanism operating means, said connecting means including a terminal member in relatively close proximity and substantially concentrically related to the pivotal axis of the pedal arm and slidably engaging said operating means and adapted to maintain such engagement for all positions of the pedal, said arcuate member being adapted to swing substantially in direction of the pivotal axis of the pedal arm, to positively bi-directionally control the mechanism.

4. A motor vehicle including a motor throttle and connections for controlling the throttle, a brake pedal having a foot support pivoted thereto, means carried by the pedal including a rock shaft which is radial with respect to the pivotal axis of the pedal, said shaft having a terminal arcuate finger concentric with the pivotal axis, and means by which the finger is adapted to control the throttle connections to allow the pedal to swing without moving said connections so that for any swinging position of the pedal said connections can be positively moved bi-directionally, and a connection by which the foot support controls the rock shaft.

5. A motor vehicle including a motor throttle and connections for controlling the throttle including a lever which has spaced stops, a brake pedal having a foot support pivoted thereto, means carried by the pedal including a rock shaft which is radial with respect to the pivotal axis of the pedal, said shaft having a terminal arcuate finger concentric with the pivotal axis, said arcuate finger being slidable between the stops of said lever, and the parts being so related that the pedal can swing without moving the lever, and further so related that for any swinging position of the pedal the lever can be positively moved bi-directionally by the finger, and a connection by which the foot support controls the rock shaft.

6. A motor vehicle including a brake mechanism, and a motor control mechanism, a pedal connected to control the brake mechanism, said pedal having a foot support pivoted thereon, a slide mounted on the pedal and adapted to be reversely translated conformably to foot support motion, means for controlling the motor control mechanism including a lever having a slot, a rock shaft mounted on the pedal and operable by the slide, said rock shaft having an arcuate arm adjacent the pivotal axis of the pedal and concentric therewith, the slot and arcuate arm being so related that the pedal arm can be depressed without changing the angular relation of the lever, and whereby the lever can be positively moved in opposite directions by the arcuate arm.

7. A pedal having two angularly related portions and having an oscillatable foot piece, a pivotal axis upon which the pedal swings, a mechanism to be controlled, an arcuate finger mounted upon the pedal and arranged in relatively close proximity to the pivotal axis and concentric therewith, and adapted to rock in a direction longitudinally of said pivotal axis for actuating said controlled mechanism, means by which said finger is oscillated in opposite directions as the result of corresponding oscillations of the foot piece, and means connecting said finger with the mechanism to be controlled.

8. A device of the class described comprising a pedal having angularly related portions, and having a pivoted foot piece, a pivotal axis for the pedal, mechanism to be controlled, an arcuate finger pivotally mounted on the pedal having a portion, concentric with and arranged in relatively close proximity to the pivotal axis, and means connecting the finger with the mechanism to be controlled.

9. A foot lever mounted to swing on a pivotal axis and having an oscillatable foot piece, said lever having angularly related portions, a rock shaft journaled on one of the angular portions and radial with respect to the pivotal axis of the pedal and having at one end a crank, a slide secured to the other angular portion, and connections between the slide and the foot piece and the slide and the crank for operating the rock shaft, a mechanism to be operated, said rock shaft having an arcuate finger which is concentric with the pivotal axis of the pedal, and means by which said finger controls said mechanism.

In witness whereof, I have hereunto set my hand this 5th day of June 1929.

EDWIN G. STAUDE.